March 26, 1968  L. MASSONE  3,374,846
STEERING AND BRAKING HYDRAULICS
Filed Oct. 21, 1965  5 Sheets-Sheet 1
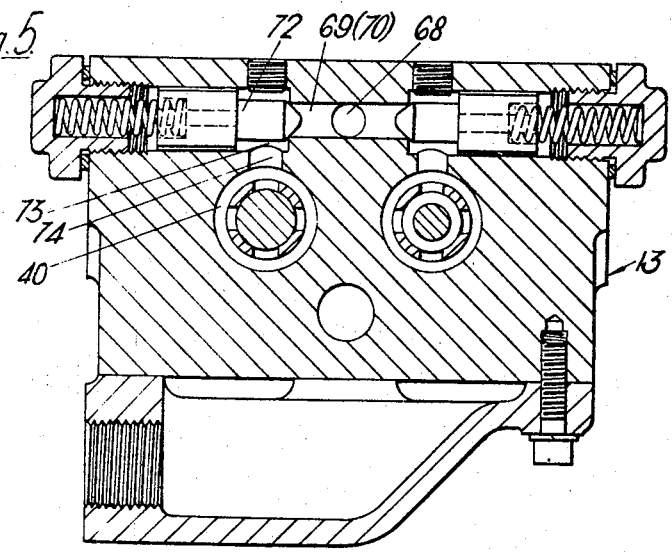
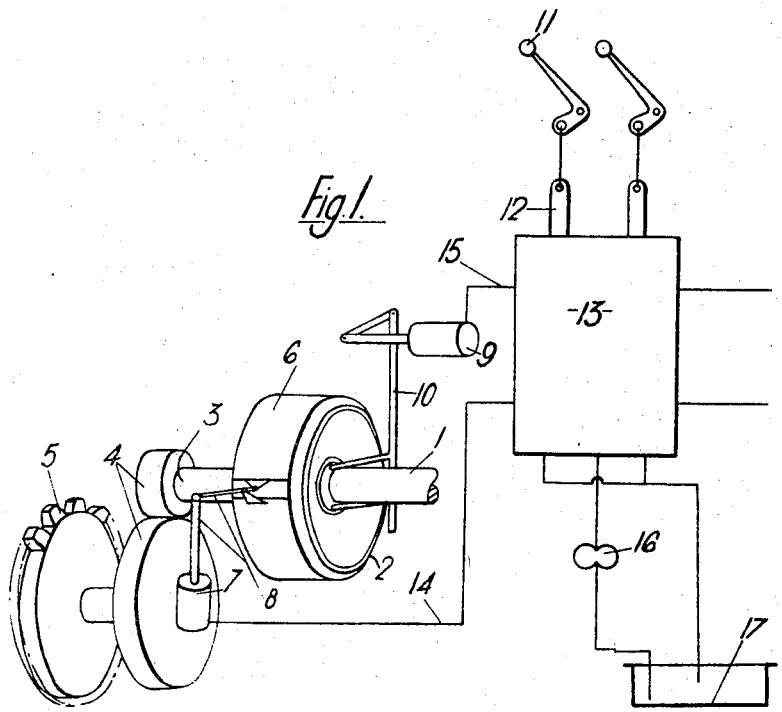
Inventor
Luigi Massone
By
Tweedale and Gerhardt
Attorneys

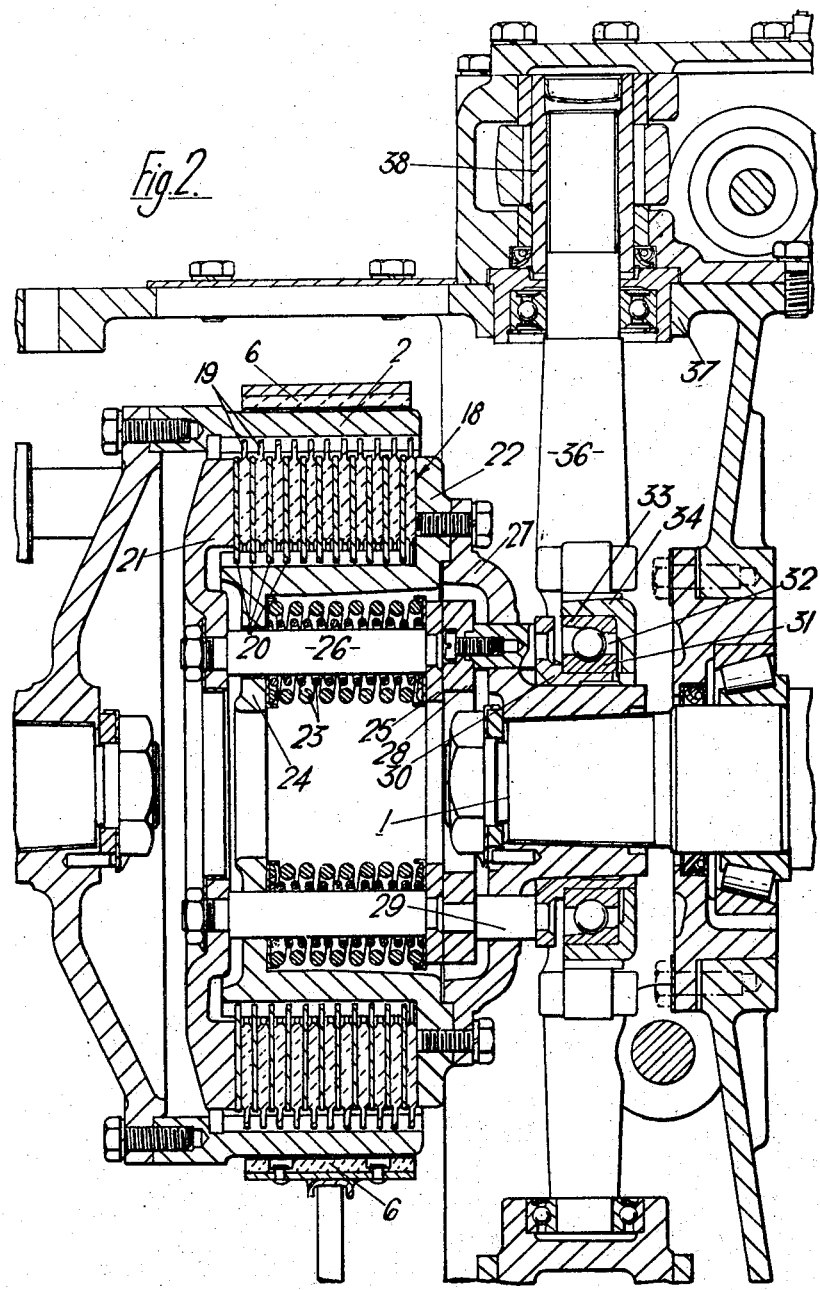

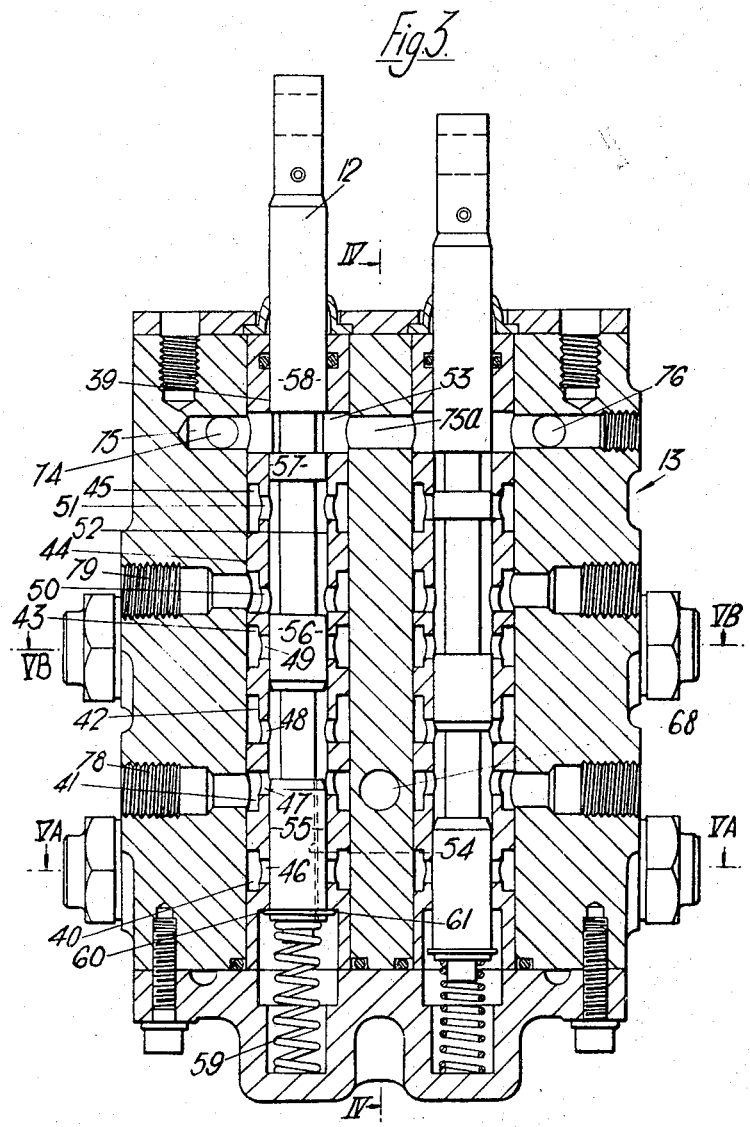

March 26, 1968  L. MASSONE  3,374,846
STEERING AND BRAKING HYDRAULICS
Filed Oct. 21, 1965  5 Sheets-Sheet 4

Inventor
Luigi Massone
By Twedale and Gerhardt
Attorneys

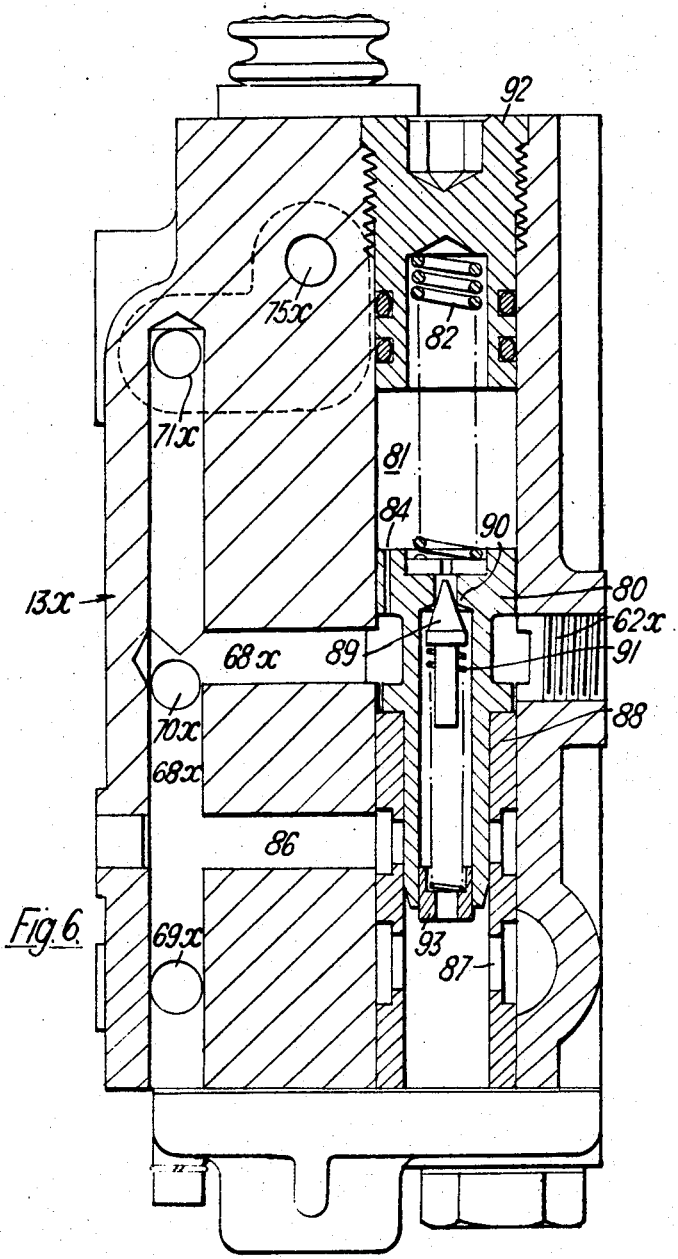

United States Patent Office 3,374,846
Patented Mar. 26, 1968

3,374,846
STEERING AND BRAKING HYDRAULICS
Luigi Massone, Genoa, Italy, assignor to Landini
S.p.A., Reggio Emilia, Italy
Filed Oct. 21, 1965, Ser. No. 499,153
8 Claims. (Cl. 180—6.7)

ABSTRACT OF THE DISCLOSURE

A hydraulic steering clutch and steering brake control for a tracked vehicle including a pair of actuating spools each of which is movable from a spring biased position to sequentially cause disengagement of the steering clutch and engagement of the steering brake of its associated track.

---

Figure 4:
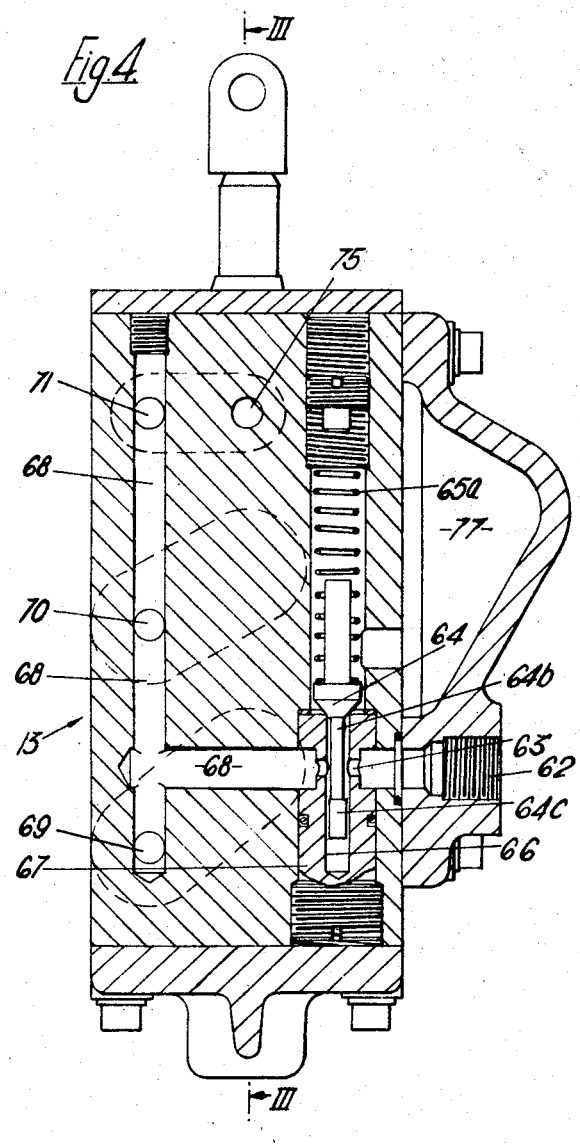

This invention relates to hydraulic control mechanisms, especially but not exclusively hydraulic control mechanisms for controlling the braking and steering of vehicles, particularly tracked vehicles.

In the control of large vehicles, particularly tracked vehicles, by mechanical control mechanisms, large levers and a great amount of physical effort is required to turn the vehicle. The large levers require a large console which is not always readily accessible to the operator. Thus, the procedure of braking one wheel and driving the other to turn the vehicle is laborious and complicated.

An object of this invention is therefore to provide a hydraulic control system for steering and braking a vehicle.

Another object is to provide a combined hydraulic steering and braking system for vehicles.

A further object is to provide a hydraulic steering and braking system for tracked vehicles that can be operated with a minimum amount of effort and in which the control levers may be arranged on a small console accessible to the operator.

According to the present invention we provide a hydraulic control mechanism comprising valve means, conduit means for hydraulically connecting said valve means to a source of pressure fluid, first and second fluid outlets in said valve means for connection to first and second hydraulically actuated devices, and a manually operable actuator associated with said valve means so that on movement of said actuator from a first position to a second position, said first fluid outlet is placed in communication with said conduit means, and on movement of said actuator to a third position said second fluid outlet is also placed in communication with said conduit means.

Preferably, said valve means is a valve and said actuator is a spool axially slidable in a bore of the valve housing, spring means urging the spool to one end of a limited travel in the bore, and including first galleries, second galleries and third galleries all communicating with said bore, and connectible respectively with said source of fluid pressure through said conduit means, with said mechanisms through said first and second fluid outlets, and with a reservoir, lands on said spool member arranged, in relation to said galleries and on movement of said valve spool against the action of said spring means, so as to disconnect one of the second galleries from the third galleries and to connect it to one of the first galleries, and on further movement to disconnect another second gallery from the third galleries and to connect it to one of the first galleries.

Further, according to the present invention we provide, a tracked vehicle in which the transmission includes for each track a hydraulically operated steering brake and a hydraulically operated steering clutch and including a hydraulic control mechanism as aforesaid, said clutch and brake being connected to said first and second fluid outlets respectively.

Preferably, the valve is adapted to operate to pressurize successively a clutch disengagement mechanism and a brake engaging mechanism of a single track of a tracked vehicle. The valve housing preferably houses two valves together with check valves for permitting pressures in the fluid pressure operated mechanisms to be maintained. A damped relief valve is also incorporated in the housing and one extreme end of the said bore is connectible with the brake engaging mechanism, the pressure applied to the brake thereby being transmitted to act against the spool member and provide resistance to movement of the spool. Said spool is moved in the valve housing by a manual actuation.

This resistance to movement feeds back to the actuator a fraction of the total force brought into play by movement of the actuator, thus enabling the person in control to sense how much force is being applied as the resistance increases.

An embodiment of the invention will now be described, by way of example, with reference to the accompanying drawings, in which:

FIG. 1 is a diagrammatic illustration of part of the transmission of a tracked vehicle and a hydraulic control mechanism therefor, FIG. 2 is a detailed cross section through a part of the transmission including the brake and clutch, FIG. 3 is a cross section through a valve housing on the line 3—3 in FIG. 4, FIG. 4 is a cross section through the valve housing of FIG. 3 on the line 4—4, FIG. 5 is a cross section through the valve housing of FIG. 3 on either of the lines VA—VA or VB—VB, and FIG. 6 shows a modified form of relief valve.

Part of the transmission for a crawler tractor is shown in FIG. 1. A shaft 1 is driven through gearing and a main clutch, which are not shown, by the engine also not shown. An annular brake drum 2 receives the drive from the shaft 1 through a clutch housed within the brake drum 2 and transmits it to a shaft 3 which connects through reduction gearing 4 to the toothed track driving wheel 5. A band brake 6 anchored to the body of the tractor encircles the brake drum 2. The brake 6 is engaged by pressurizing a hydraulic ram 7 which acts through a mechanical linkage 8 connected to the brake 6. Disengagement of the clutch is effected by pressurizing a hydraulic ram 9 which acts through a mechanical linkage 10. The operation of both the rams 7 and 9 are controlled by movement of a single manual lever 11 acting on a valve spool 12 within the valve block 13. Fluid pressure pipes 14 and 15 connect the rams 7 and 9 respectively with the valve block 13. With the exception of the valve block 13, similar elements to those just described are present on the opposite side of the tractor for transmitting drive to the other track, the operation of such similar elements being the same as for those described.

A pump 16 taking fluid from a reservoir 17 supplies pressure fluid for the rams 7 and 9, while fluid draining from the system is led back to the reservoir 17.

Housed within the brake drum 2 is a clutch 18 (FIG. 2). Clutch 18 is of the multi-plate type, a pack of friction plates 19 being drivingly engaged with splines on the inner circumferential surface of the brake drum 2 and adapted to be clamped between another pack of clutch plates 20 interleaved with them. Pressure plates 21 and 22 at the respective ends of the clutch plates are sprung towards each other by the action of compression springs 23 abutting between a radially inward annular extension 24 of plate 22 and a thrust plate 25 secured to plate 21 by a series of pins 26 passing through the middle of springs 23. The plate 22 is secured to a flange 27 which is splined to shaft 1 and which supports an annular thrust member 28 axially movable into engagement with thrust plate 25 to disengage the clutch 18.

Thrust pins 29 pass through the flange 27 and secure the member 28 to a collar 30 which carries the inner race 31 of a thrust bearing 32, and which is carried by and can be moved axially on the flange 27. The outer race 33 is carried in a support 34 which is trunnioned in an aperture 35 in a vertically extending frame 36 journalled in the transmission housing 37 to one side of the shaft 1. A short arm 38 is splined to the top end of the frame 36 and extends in a direction perpendicular to the longitudinal axis thereof. At the end of the arm 38 remote from the frame 36 a roller is journalled in position to abut against the end of ram 9 when the latter is extended by fluid pressure.

On pressurizing the ram 9, the arm 38 and frame 36 are turned, thus causing the support 34 to move the bearing 32, collar 30, thrust member 28 into abutment with thrust plate 25 and subsequently to move plate 21 to the left, thus disengaging the clitch 18. Engagement of the band brake 6 which encircles the drug 2 is effected in a similar manner and by a similar mechanism.

The interior of the valve housing 13 is shown in FIGS. 3, 4, and 5. The housing 13 contains two spool valves which operate in a similar manner and therefore only one spool valve and its operation will be described.

A tubular insert 39 having grooves formed on its outer surface cooperates with the closely encircling valve block 13 to form galleries 40 to 45 inclusive. Ports 46 to 51 connect the galleries 40 to 45 respectively with the inner bore 52 of the insert 39 and ports 53 are provided at the upper end thereof. A spool 12 having lands 55, 56, 57 and 58 is slidable in the bore 52 and is spring loaded to an uppermost position by a compression spring 59 acting on the lower end thereof. Also, provided at the lower end and secured thereto is a ring 60 which abuts against a flange 61 on the insert 39. Land 55 is provided with an axial leak path 54 through it so that brake pressure is always present in the region of the spring 59.

Pressure fluid is fed to the valve housing 13 through an entry 62 (FIG. 4) comunicating with a chamber 63 containing a conical damped relief valve 64 spring loaded onto its seat by a spring 65a. A narrow neck 64b joins the conical valve 64 with a plunger 64c movable in a small bore 66 in a block 67. Leakage occurs past the plunger 64c which causes it to act as a dash pot, thus damping the action of the relief valve 64. A central passage 68 connects the chamber 63 with passages 69, 70 and 71 which extend transversely as seen in FIG. 5. Passage 69 terminates in a check valve 72 which permits flow so long as the pressure in passage 69 is sufficient to cause flow to chamber 73 on the downstream side of the check valve 72. A passage 74 connects chamber 73 with gallery 40. FIG. 5 is a cross section on line VA or VB and in the case of a section on the line VB, the passage 70 would be joined to gallery 43.

The passage 71 joins up with a passage 75 to feed the ports 53 and passage 75a. A drain passage 76 connects with passage 75a and delivers drained fluid to an exhaust compartment 77. Galleries 42 and 45 are also connected to the compartment 77 (FIG. 4).

Gallery 41 is connected to brake pressure pipe 14 through outlet 78 while gallery 44 is connected to clutch pressure pipe 15 through outlet 79.

The operation of the valve and transmission is as follows. Fluid is constantly pumped into the valve housing 13 through inlet 62 and unless one or other or both of the spools 12 are lowered to block the ports 53, the fluid will merely pass through passages 68, 71, 74, 75 and 76 to drain compartment 77. Immediately a port 53 is blocked by lowering a spool 12, a pressure is developed in passage 68 for operation of the rams. Blockage of port 53 by land 58 necessarily entails blockage of the drain port 51 by land 57 and the pressure port 49 and clutch port 50 are permitted to communicate, thus allowing pressure fluid, which passes through the check valve 72, through to the clutch ram 9 to disengage the clutch 18. This condition of the valve is seen in the position of the right hand spool 12 in FIG. 3. In this condition it will be observed that the pressure port 46 is still blocked by land 55 and that the brake port 47 and drain port 48 are in communication.

Further movement of the spool 11 maintains the clutch in its disengaged state i.e. ports 49 and 50 remain in communication, and partially blocks the drain port 48 while allowing ports 46 and 47 into communication with each other. Pressure fluid is thus permitted to operate the brake ram 7 to engage the brake 6. The leakage path 54 through the land 55 enables brake pressure to act on the bottom of the spool 12 in an upward direction thus making it harder for the operator to move the lever 11 downwardly as braking is increased and thus giving him a positive indication of the extent to which the brake is applied. Consequently, progressive movement of lever 11 from a neutral position causes the clutch for one track to be disengaged and subsequently to positively brake that track.

In FIG. 6 is shown a modified form of relief valve. This valve would replace the damped relief valve shown in FIG. 4. The valve body in this case is modified slightly, but parts already described with reference to the other figures are designated with the same reference numerals, with the addition of the suffix X. As in the case of FIG. 4, pressure fluid is passed to the valve housing 13X through an entry port 62X which communicates with a bore in the housing 13X containing a valve spool 80. The valve spool 80 is slidable in the bore and in the normal operation position seats on a ported sleeve 88 fixed in the bore. The spool 80 has a neck which registers with the entry port 62X when the spool 80 is in the position shown in FIG. 6, and allows the pressure fluid to pass to the passage 68X. The spool 80 is urged to the lowermost position into abutting contact with the sleeve 88 by a spring 82 contained in a chamber 81 above the spool 80, and reacting against a plug 92 blanking off the bore. The spool 80 has a small bore passage 84 communicating the neck of the spool 80 and the chamber 81. Finally, the spool 80 has an axial bore with a narrow neck 90 which is normally closed by a cone valve 89 urged to the closing position by a spring 91; the spring 91 seats against a drilled plug 93 in the spool 80 and the lower end of the bore communicates with the sump through a port 87 in the sleeve 88. There is an additional passage 86 which can communicate with the bore to sump, but is normally cut off from sump by the spool 80; passage 86 is in constant communication with passage 68X.

In normal operation, the pressure of the fluid in the neck and chamber 81 is the same by virtue of the connecting pasage 84, the spool 80 seats on the sleeve 88 and the neck 92 is closed by the cone valve 89. However, should, for some reason, the pressure in chamber 81 rise sufficiently, the cone value is unseated and the pressure in chamber 81 collapses as fluid flows out to sump through the bore of the spool 80 and port 87. This collapse in pressure results in a pressure differential between the neck and the chamber 81 causing the spool to rise against the spring 82 and uncover the bore to passage 86 whereupon the fluid in passage 68X exhausts to sump. The dimensions of passage 84 are such that the collapse of pressure in chamber 81 is not experienced in the neck; the opposing forces of the neck are of different size so that the pressure fluid pushes the spool 80 upwards.

On pressure equalization in the neck and chamber 81, the spool 80 returns to the lowermost position, and the cone valve re-closes the neck 92.

The primary advantage resulting from the above described embodiment of the invention is the consecutive hydraulic actuation in two stages of the clutch and the brake by the movement of a valve controlling lever. A secondary advantage is that a single pump with a reduced capacity can be used. An overriding pedal operated mechanical brake linkage is retained for safety purposes.

Other advantages are that the control of the tracked vehicle does not demand as high a muscular effort as with purely mechanical control mechanisms, especially in larger vehicles, the larger levers associated with a purely mechanically controlled transmission are not required because the control can be effected by small levers positioned in a relatively small console, and improved access to the operator's position and provision for improved operator comfort can be made by using the space made free by elimination of the large levers.

The invention is not necessarily restricted to the field of vehicle transmission, but may be applied where two, three, or more successive hydraulic operations are required.

I claim:

1. A hydraulic control mechanism including first and second hydraulically actuated devices, valve means, conduit means for hydraulically connecting said valve means to a source of fluid pressure, first and second fluid outlets in said valve means for connection to said first and second hydraulically actuated devices, respectively, and manually operable actuator means associated with said valve means movable from a first position to a second position to place said first fluid outlet in communication with said conduit means, and movable to a third position to place said second fluid outlet in communication with said conduit means, said valve means comprising a valve having a housing and said actuator means comprising a spool axially slideable in a bore of the valve housing, spring means urging the spool to one end of a limited travel in the bore; and including a first pair of galleries, a second pair of galleries and a third pair of galleries all communicating with said bore and connectable respectively with said source of fluid pressure through said conduit means, with said mechanisms through said first and second fluid outlets, and with a reservoir; lands on said spool member arranged in relation to said galleries and on movement of said valve spool against the action of said spring means so as to disconnect one of the second galleries from the third galleries and connect it to one of the first galleries, and on further movement to disconnect another second gallery from the third galleries and to connect it to one of the first galleries.

2. A hydraulic control mechanism according to claim 1 characterized in that said actuator is associated with said valve means so that movement between the first and second positions is in the same direction as movement between the second and third positions.

3. A hydraulic control mechanism according to claim 1 characterized in that one end of the spool is in communication with either the first or second fluid outlets so that the pressure in the relevant actuator is always applied to the end of the spool.

4. A hydraulic control mechanism according to claim 3 further including a second spool slideable in a second bore of said valve housing, and a check valve for each of said spools for maintaining pressure in the fluid pressure operator mechanisms.

5. A hydraulic control mechanism according to claim 1 further including a clamped relief valve in said conduit means.

6. A tracked vehicle having transmission including, a hydraulically operated steering brake and a hydraulically controlled steering clutch for each track characterized by a hydraulic control mechanism according to claim 1 in that said clutch and brake are respectively hydraulically connected to said first and second fluid outlets.

7. A tracked vehicle according to claim 6 characterized in that the brake is a band brake actuable through levers by a hydraulic actuator, the drum of the brake being secured to a shaft which in operation supplies power to one of the tractor final drive wheels.

8. A tracked vehicle according to claim 6 characterized in that the clutch is of the friction plate hydraulic actuable type, and is suitably located in the transmission.

References Cited

UNITED STATES PATENTS

| 2,506,842 | 5/1950 | Rockwell | 192—17.1 |
| 2,712,370 | 7/1955 | Westfall | 180—6.2 X |
| 2,941,639 | 6/1960 | Christenson et al. | 192—13 |
| 2,975,851 | 3/1961 | Youmans et al. | 180—6.2 |

FOREIGN PATENTS

| 570,202 | 1/1945 | Great Britain. |
| 579,566 | 8/1946 | Great Britain. |

LEO FRIAGLIA, *Primary Examiner.*

BENJAMIN HERSH, *Examiner.*

J. A. PEKAR, *Assistant Examiner.*